Patented Oct. 2, 1951

2,569,441

UNITED STATES PATENT OFFICE 2,569,441

CATALYTIC CONVERSION OF POLY-CHLOROCYCLOHEXANES TO POLY-CHLOROBENZENE

Francis N. Alquist, Joseph L. Wasco, and Kenneth C. Kauer, Midland, Mich., assignors to The Dow Chemical Company, Midland, Mich., a corporation of Delaware No Drawing. Application March 14, 1949, Serial No. 81,402

3 Claims. (Cl. 260—650)

This invention relates to a method for the conversion of hexachlorocyclohexane (also known as benzene hexachloride) to trichlorobenzenes, and of higher chlorinated cyclohexanes to the correspondingly higher chlorinated benzenes.

It is known that, when chlorine is added to benzene, a mixture of isomeric forms of benzene hexachloride is obtained. It is also known that, of the various isomers so-produced, only the so-called gamma isomer has significant utility as an insecticide. The other isomers appear to be mere diluents of the insecticidal activity of the gamma isomer. Methods have been developed to separate the active gamma-benzene hexachloride from the relatively inactive isomers. Accordingly, there has arisen the problem of utilizing the relatively large amount of insecticidally inactive benzene hexachloride. It is known, of course, that benzene hexachloride reacts slowly with caustic alkalies at elevated temperatures to form trichlorobenzene. This is a valuable product, and one which can be made in purer form from benzene hexachloride than by the direct substitution chlorination of benzene. Since, however, the reaction of benzene hexachloride with alkali hydroxide forms three moles of salt (by the neutralization of three moles of the hydroxides) for each mole of benzene hexachloride treated and each mole of trichlorobenzene produced, the process is not economical. If the chlorine removed from the benzene hexachloride could be recovered in a chemically active form, and without destruction of other chemical values, this would be the practical way of making trichlorobenzene, free from dichloro- and tetrachlorobenzenes. Analogously, if such a process can be developed, it should be applicable to the production of tetrachlorobenzene from heptachlorocyclohexane (monochlorobenzene hexachloride) or to the production of pentachlorobenzene from octachlorocyclohexane (dichlorobenzene hexachloride).

It is the object of this invention to provide a method whereby hexachlorocyclohexane (benzene hexachloride) may be converted catalytically to trichlorobenzene. A related object is to provide such a method whereby mono- and dichlorobenzene hexachlorides may be converted to tetra- and pentachlorobenzene.

We have found that the chlorine values in benzene hexachloride need not be lost, and that they can be recovered in a chemically active form, while converting benzene hexachloride to trichlorobenzene by heating benzene hexachloride with a catalytic amount, usually from 0.5 to 5 per cent of its weight, of anhydrous aluminum chloride at a temperature which is preferably between 125° C. and 225° C. Hydrogen chloride is given off and may be utilized as desired. At reaction temperatures below 200° C., the trichlorobenzene produced remains in the reaction vessel, while at reaction temperatures between 205° and 225° C., the trichlorobenzene boils away from the reaction mixture. The catalyst tends to sublime, and more should be added to replace it. The method is adapted to continuous operation, at the higher reaction temperatures, benzene hexachloride being fed into the hot reaction vessel together with a small amount of aluminum chloride, while hydrogen chloride and trichlorobenzene are distilled from the vessel.

Experience has shown that from 85 to 95 per cent of the theoretical amount of hydrogen chloride will be recovered from the process, while from 80 to 90 per cent of the theoretical amount of trichlorobenzene is recovered, in batch operation.

In a specific example, a mixture of 125 grams of the alpha isomer of benzene hexachloride and 1 gram of anhydrous aluminum chloride was heated in a flask fitted with a thermometer and a reflux condenser, from the upper end of which a tube was provided to conduct hydrogen chloride to water in an absorbing tower. When the temperature in the reaction vessel reached 170° C., hydrogen chloride was being generated, and at 210°–220° C. the trichlorobenzene refluxed. There was absorbed in the scrubber 39 grams of hydrogen chloride, or about 85 per cent of the theoretical yield. The reaction mixture was cooled, water was added to the flask, and 64 grams of trichlorobenzene was recovered by steam distillation. This is 81 per cent of the theoretical yield. A small amount of black tarry material remained in the reaction vessel.

In a similar manner, each of the beta, gamma, and delta isomers of benzene hexachloride was heated with a catalytic amount of anhydrous aluminum chloride, and in each instance the yield of hydrogen chloride and of trichlorobenzene was comparable with that reported above. The trichlorobenzene in each case consisted of from 81 to 85 per cent 1,2,4-trichlorobenzene and from 15 to 19 per cent 1,2,3-trichlorobenzene. No 1,3,5-trichlorobenzene was found.

100 grams of the hexachloride of monochlorobenzene was mixed with 1 gram of anhydrous aluminum chloride and heated at temperatures of 100°–160° C. for 2 hours. There was recovered 29.9 grams of hydrogen chloride and 69 grams of a mixture of all the isomeric tetrachlorobenzenes. There was no trichlorobenzene in the product.

When a crude mixture of heptachlorocyclohexane and octachlorocyclohexane was heated in like manner with 1 per cent of anhydrous aluminum chloride, the chlorobenzene product, after the dehydrochlorination reaction was complete, was a mixture of tetrachlorobenzenes and pentachlorobenzene.

No practical rate of reaction is found at temperatures below 90° C., and no advantage is found in operating at temperatures above 250° C. The most generally useful temperatures have been found between 125° and 225° C. Any such temperature may be used, at which the particular mixture of hexachloride and catalyst gives off hydrogen chloride at a practical rate.

We claim:

1. The method which consists essentially in heating a compound from the group consisting of benzene hexachloride, monochlorobenzene hexachloride and dichlorobenzene hexachloride with from 0.5 to 5 per cent of its weight of anhydrous aluminum chloride at a temperature above 90° C. at which hydrogen chloride is liberated, until about 3 moles of hydrogen chloride is liberated per mole of feed, and recovering the resultant polychlorobenzenes.

2. The method which consists essentially in heating benzene hexachloride with from 0.5 to 5 per cent of its weight of anhydrous aluminum chloride at a temperature of from 125° to 225° C., until the evolution of hydrogen chloride is substantially complete, and recovering trichlorobenzene from the reaction mixture, free from lower chlorobenzenes and from 1,3,5-trichlorobenzene.

3. The method which consists essentially in heating monochlorobenzene hexachloride with from 0.5 to 5 per cent of anhydrous aluminum chloride at a temperature of from 100° to 220° C., until evolution of hydrogen chloride is substantially complete, and recovering tetrachlorobenzene from the reaction mixture.

FRANCIS N. ALQUIST.
JOSEPH L. WASCO.
KENNETH C. KAUER.

REFERENCES CITED

The following references are of record in the file of this patent:

UNITED STATES PATENTS

| Number | Name | Date |
| --- | --- | --- |
| 2,467,123 | Fleck et al. | Apr. 12, 1949 |

OTHER REFERENCES

Van der Linden: "Ber. der deut. chem. Gesell.," vol. 45, pages 244–7 (1912).